(12) United States Patent
Hu et al.

(10) Patent No.: US 7,780,320 B2
(45) Date of Patent: Aug. 24, 2010

(54) STREET LAMP SYSTEM

(75) Inventors: Chi-Chung Hu, Miao-Li Hsien (TW); Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 123 days.

(21) Appl. No.: 12/257,779

(22) Filed: Oct. 24, 2008

(65) Prior Publication Data

US 2009/0244901 A1 Oct. 1, 2009

(30) Foreign Application Priority Data

Mar. 28, 2008 (CN) .................. 2008 1 0300766

(51) Int. Cl.
*F21S 8/00* (2006.01)
*F21V 33/00* (2006.01)
*F21V 29/00* (2006.01)

(52) U.S. Cl. .................. 362/431; 362/96; 362/294; 362/373; 362/800

(58) Field of Classification Search .................. 362/431, 362/218, 294, 373, 96, 547, 345
See application file for complete search history.

(56) References Cited

U.S. PATENT DOCUMENTS 3,270,480 A * 9/1966 Beecker .................. 52/848
4,641,571 A * 2/1987 Anderson et al. .................. 454/19
D387,459 S * 12/1997 Cool .................. D26/68
5,918,972 A * 7/1999 Van Belle .................. 362/480
7,278,761 B2 * 10/2007 Kuan .................. 362/294
2003/0190883 A1 * 10/2003 Shockey .................. 454/19
2008/0037243 A1 * 2/2008 Discoe et al. .................. 362/183
2008/0285265 A1 * 11/2008 Boissevain .................. 362/218

FOREIGN PATENT DOCUMENTS

CN 200949788 Y * 9/2007
CN 101059237 A 10/2007

* cited by examiner

*Primary Examiner*—Jong-Suk (James) Lee
*Assistant Examiner*—David R Crowe
(74) *Attorney, Agent, or Firm*—Andrew C. Cheng

(57) ABSTRACT

A street lamp system includes a hollow lamp post, an illumination device, a wind turbine, a connecting shaft and a number of fan leaves. The lamp post has an air flowing channel defined therein. The illumination device includes a solid-state light source and a heat dissipation device thermally coupled to the solid-state light source, and is coupled on the lamp post with the heat dissipation device disposed in the air flowing channel. The wind turbine is mechanically coupled to the lamp post to be driven by wind energy to rotate, thereby directing flowing of the air in the channel from the air inlet to the air outlet.

9 Claims, 3 Drawing Sheets

STREET LAMP SYSTEM

BACKGROUND

1. Field of the Invention

The present invention relates to street lamp systems and, particularly, to a street lamp system utilizing wind energy to supply electric power to solid-state light source and improve the heat dissipation efficiency thereof.

2. Description of Related Art

In recent years, due to their excellent light quality and high luminous efficiency, light emitting diodes (LEDs) have been increasingly applied to substitute for cold cathode fluorescent lamps (CCFL) as light source of an illumination device, referring to "Solid-State Lighting: Toward Superior Illumination" by Michael S. Shur, et al., Proceedings of the IEEE, Vol. 93, NO. 10 (October, 2005).

Illuminating stability of the LEDs is affected by heat generated from the LEDs. When the temperature of the LEDs is too high, light intensity of the LEDs may gradually attenuate, shortening the lifespan of the illumination devices. Thus, some illumination devices include heat dissipation devices, such as exhaust fans, thermoelectric coolers, etc., to dissipate heat. However, the heat dissipation devices require a great amount of electricity to function, such that application of the heat dissipation devices can defeat the purpose of saving energy by using LEDs.

What is needed, therefore, is an improved street lamp system that can overcome the above shortcomings.

SUMMARY

A street lamp system includes a hollow lamp post, an illumination device, a wind turbine, a connecting shaft and a plurality of fan leaves. The hollow lamp post has an air inlet and an air outlet defined therein. An air flowing channel is defined in the lamp post between the air inlet and the air outlet. The illumination device includes a solid-state light source and a heat dissipation device. The heat dissipation device is thermally coupled to the solid-state light source. In addition, the illumination device is coupled to the lamp post with the heat dissipation device disposed in the air flowing channel. The wind turbine is mechanically coupled to the lamp post to be driven by wind energy to rotate. The connecting shaft is mechanically coupled to the wind turbine to be driven by the wind turbine to rotate. The fan leaves are mechanically coupled to the connecting shaft and disposed in the hollow lamp post, to be driven by the connecting shaft to rotate, thereby directing flowing of the air in the channel from the air inlet to the air outlet.

Other advantages and novel features of the present street lamp system will become more apparent from the following detailed description when taken in conjunction with the accompanying drawings.

BRIEF DESCRIPTION OF THE DRAWINGS

Many aspects of the present street lamp system can be better understood with reference to the following drawings. The components in the drawings are not necessarily drawn to scale, the emphasis instead being placed upon clearly illustrating the principles of the present illumination device. Moreover, in the drawings, like reference numerals designate corresponding parts throughout the several views.

DETAILED DESCRIPTION

Figure 1:
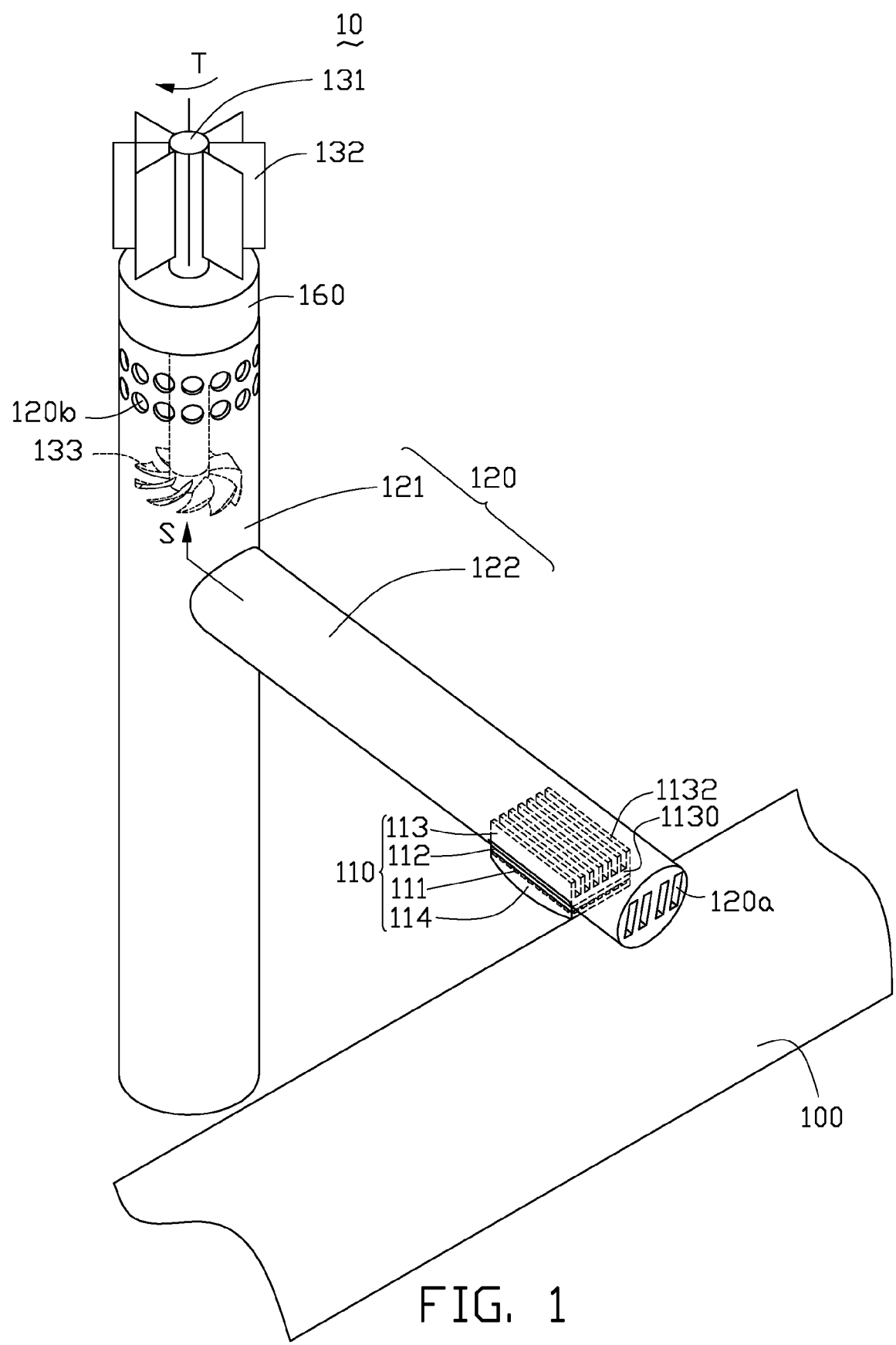
FIG. 1 is a schematic, isometric view of a street lamp system, in accordance with a first embodiment.

Referring to FIG. 1, a street lamp system 10, in accordance with a first embodiment, includes an illumination device 110, a hollow lamp post 120, a connecting shaft 131, a wind turbine 132 and a plurality of fan leaves 133.

The illumination device 110 includes a plurality of solid-state light sources 111, a circuit board 112, a heat dissipation device 113 and a light permeable cover 114. The solid-state light sources 111 can be fluorescent lamps or incandescent lamps, or preferably, LEDs. The heat dissipation device 113 is a heat sink. The heat sink 113 includes a base 1130 and a plurality of fins 1132 extending from the base 1130 and substantially perpendicular to the base 1130. The LEDs 111 are mounted on the circuit board 112. The base 1130 of the heat sink 113 thermally contacts the circuit board 112, with the fins 1132 positioned at a side of the circuit board 112 facing away from the LEDs 111. The light permeable cover 114 is disposed opposite to the base 1130 and covers the LEDs 111. The light permeable cover 114 is generally made of transparent materials, such as glass or plastic materials. In addition, the light permeable cover 114 can be a plate, a lens array or a lens.

The lamp post 120 includes a main post 121 and a subaltern post 122 extending sideward from the main post 121. The main post 121 and the subaltern post 122 are hollow and communicate with each other. The subaltern post 122 defines an air inlet 120a at an end thereof far away from the main post 121. The main post 121 defines an air outlet 120b at a top end thereof. An air flowing channel (shown by the arrowhead S in FIG. 1) is defined from the air inlet 120a to the air outlet 120b. The illumination device 110 is coupled to the subaltern post 122, with the heat sink 113 arranged in the air flowing channel S and the fins 1132 thereof parallel with a direction along the air flowing channel S, and some other parts, such as the LED 111 mounted to and below the subaltern post 122. The subaltern post 122 provides some sort of waterproof and dustproof functions for the heat sink 113.

The street lamp system 10 further includes a bearing 160 mounted to a top end of the main post 121 adjacent to the connecting shaft 131. The connecting shaft 131 is mechanically coupled to the top end of the main post 121 through the bearing 160. The connecting shaft 131 is coaxial with the main post 121, with two distal ends mechanically coupled to the wind turbine 132 and the fan leaves 133, respectively. The wind turbine 132 is arranged outside the main post 121.

In operation, the lamp post 120 is positioned on an edge of a traffic lane 100. Electric current is applied to the LEDs 111 to illuminate the traffic lane 100. Heat generated from the LEDs 111 is transferred to the heat sink 113. The wind turbine 132 is driven by wind energy to rotate (the rotating direction is shown by the arrowhead T in FIG. 1), thus bringing along the connecting shaft 131 and the fan leaves 133 to rotate. Once the fan leaves 133 rotate, external air is drawn through the air inlet 120a into the subaltern post 122. The air flows through the air flowing channel S to bring away heat accumulated on the heat sink 113 and exits through the air outlet 120b Therefore, efficiency of the heat dissipation of the LEDs 111 is improved, the illumination device 110 operates continually in a certain temperature range, achieving stable optical performance. Additionally, without consuming electric energy, the heat dissipation function of the LEDs 111 is achieved merely by application of wind energy, thus meeting energy saving requirement.

In present embodiment, the lamp post 120 includes a main post 121 and a subaltern post 122. In alternative embodiment, any switchable lamp posts 120 known to those skilled in the art and guided by the teachings herein provided may be used. For example, there can be more than one (e.g. a plurality of) subaltern posts 122 extending sideward from the main post 121, thus, the street lamp system 10 may include a plurality of illumination devices 110 assembled on the subaltern posts 122 respectively to illuminate the traffic lane 100.

Figure 2:
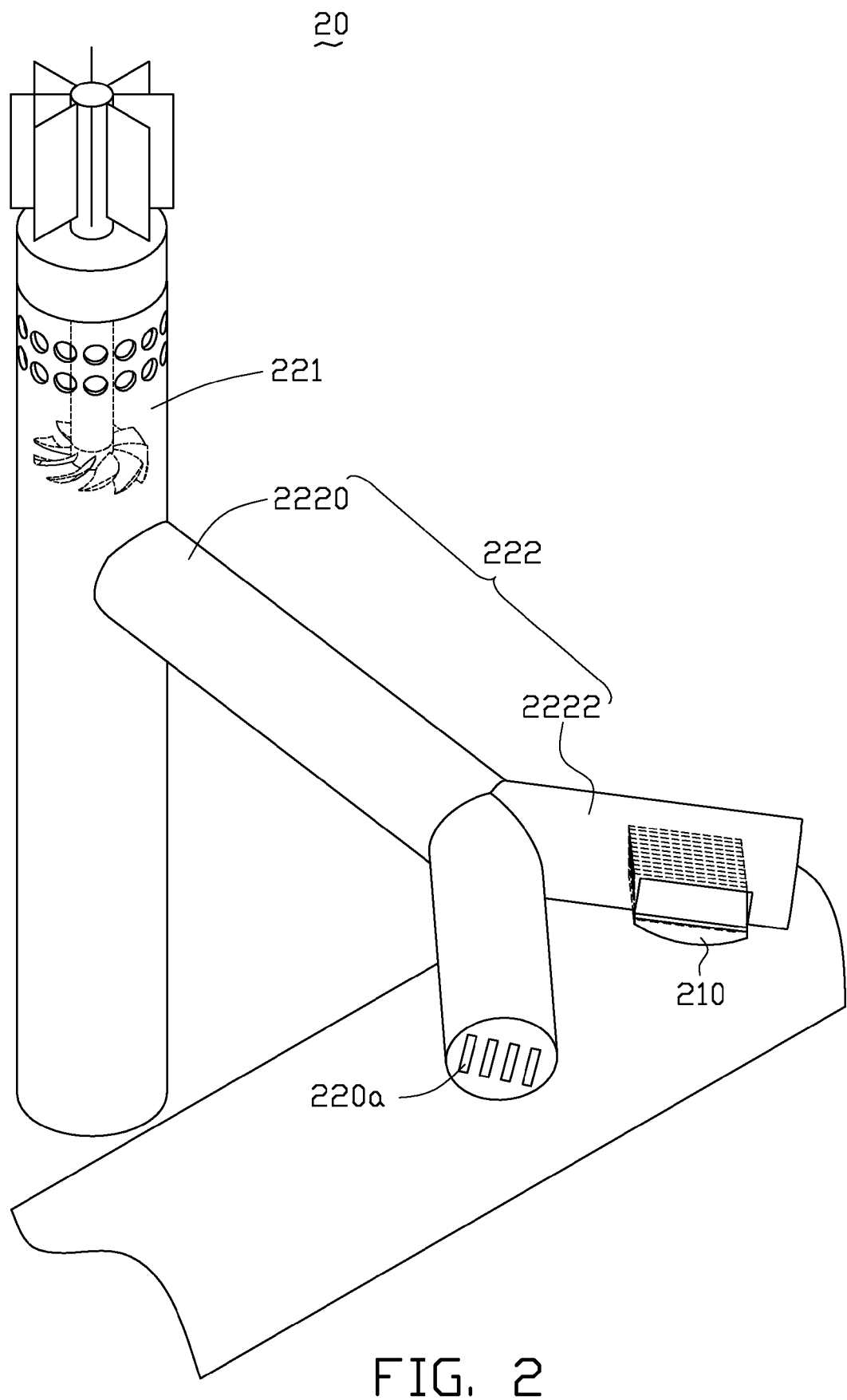
FIG. 2 is a schematic, isometric view of a street lamp system, in accordance with a second embodiment.

FIG. 2 shows a street lamp system 20, in accordance with a second embodiment. The street lamp system 20 is distinguished from the street lamp system 10 of the first embodiment in that the subaltern post 222 includes a first subaltern post 2220, and two second subaltern posts 2222 extending from a end of the first subaltern post 222 far away from the main post 221, and each of the second subaltern posts 222 has an air inlet 220a defined at a end thereof far away from the first subaltern post 2220. Additionally and correspondingly, the street lamp system 20 includes two illumination devices 210 assembled on the two second subaltern posts 2222, respectively.

Figure 3:
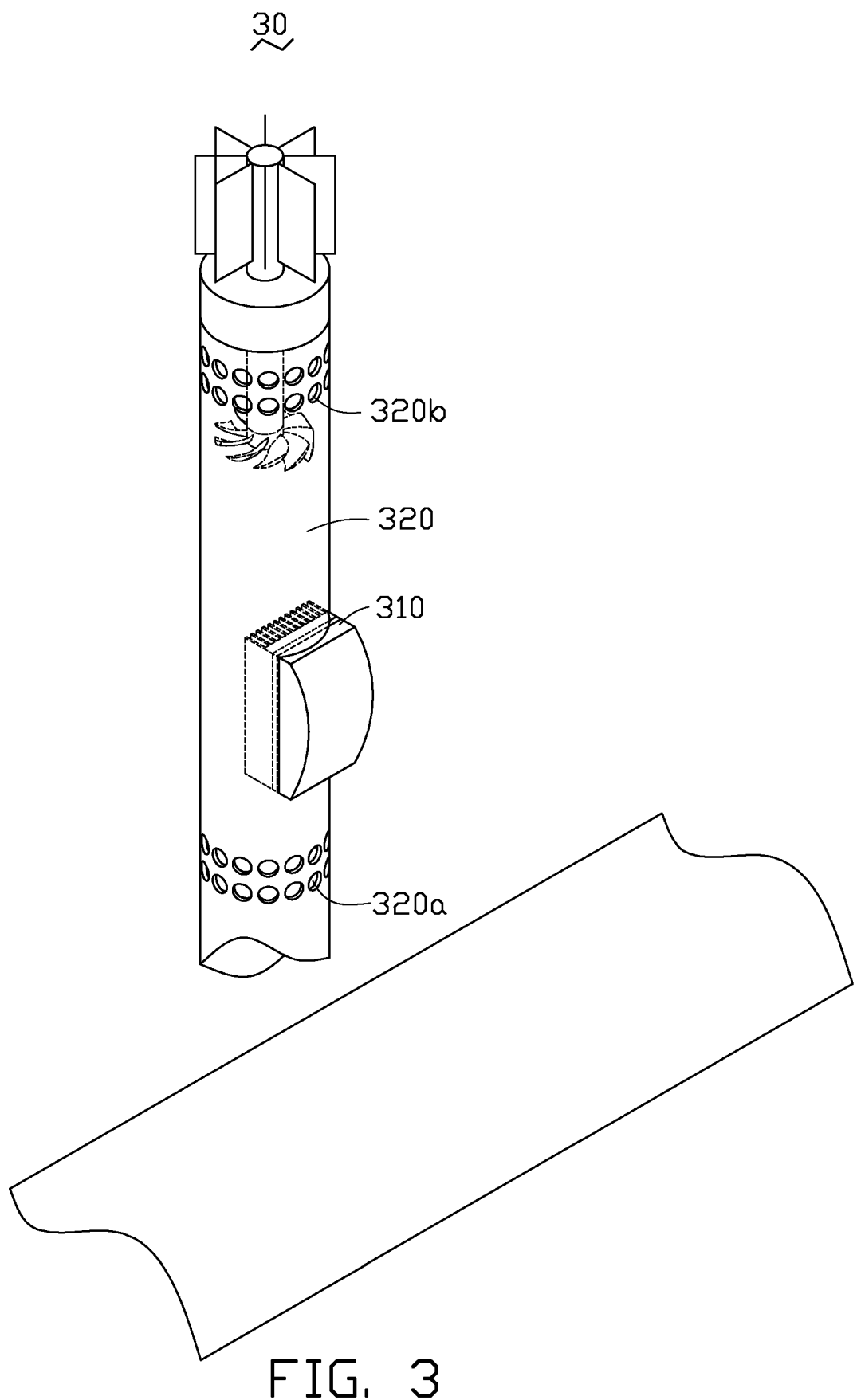
FIG. 3 is a schematic, isometric view of a street lamp system, in accordance with a third embodiment.

FIG. 3 shows a street lamp system 30, in accordance with a third embodiment. The street lamp system 30 is distinguished from the street lamp system 10 of the first embodiment in that the lamp post 320 includes merely a main post 320, and the air inlet 320a is defined in a bottom end of the main post 320, the illumination device 310 is assembled on the main post 320 between the air inlet 320a and the air outlet 320b.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A street lamp system, comprising:
    a hollow lamp post having an air inlet and an air outlet defined therein, and an air flowing channel defined in the lamp post between the air inlet and the air outlet;
    an illumination device comprising a solid-state light source and a heat dissipation device thermally coupled to the solid-state light source, the illumination device being coupled to the lamp post with the heat dissipation device disposed in the air flowing channel;
    a wind turbine mechanically coupled to the lamp post to be driven by wind energy to rotate;
    a connecting shaft mechanically coupled to the wind turbine to be driven by the wind turbine to rotate;
    a plurality of fan leaves, mechanically coupled to the connecting shaft and disposed in the hollow lamp post to be driven by the connecting shaft to rotate, thereby directing flowing of the air in the channel from the air inlet to the air outlet.

2. The street lamp system of claim 1, wherein the lamp post comprises a main post and a subaltern post extending sideward from the main post, and the illumination device is arranged on the subaltern post.

3. The street lamp system of claim 2, wherein the air inlet is defined in an end of the subaltern post far away from the main post, the air outlet being defined in the main post.

4. The street lamp system of claim 2, wherein the subaltern lamp post comprises a first subaltern post extending sideward from the main post and a second subaltern post extending from an end of the first subaltern post far away from the main post, the illumination device is arranged on the second subaltern post.

5. The street lamp system of claim 4, wherein the air inlet is defined in an end of the second subaltern post far away from the first subaltern post, the air outlet is defined in the main post.

6. The street lamp system of claim 1, wherein the illumination device further comprises a circuit board, with the solid-state light source mounted thereon.

7. The street lamp system of claim 6, wherein the heat dissipation device comprises a base thermally contacting the circuit board, and a plurality of fins extending from the base facing away from the circuit board.

8. The street lamp system of claim 7, wherein the fins of the heat sink are parallel with a direction along the air flowing channel.

9. The street lamp system of claim 1, wherein the light source includes light emitting diode.

\* \* \* \* \*